United States Patent [19]
Holroyd

[11] Patent Number: 5,452,264
[45] Date of Patent: Sep. 19, 1995

[54] RESONANT ACOUSTIC EMISSION TRANSDUCER

[75] Inventor: Trevor J. Holroyd, Nr. Matlock, England

[73] Assignee: Holroyd Instruments Limited, Derbyshire, England

[21] Appl. No.: 301,848

[22] Filed: Sep. 7, 1994

[30] Foreign Application Priority Data

Sep. 23, 1993 [GB] United Kingdom ............... 9319642

[51] Int. Cl.⁶ ........................................... H04R 17/00
[52] U.S. Cl. ................................... 367/140; 310/322; 310/326; 310/336; 73/632; 73/644; 73/587
[58] Field of Search ............... 367/140; 310/322, 323, 310/326, 336; 73/579, 632, 644, 648, 587

[56] References Cited

U.S. PATENT DOCUMENTS

| | | | |
|---|---|---|---|
| 3,855,847 | 12/1974 | Leschek | 73/587 |
| 4,011,472 | 3/1977 | Feng | 310/327 |
| 4,309,903 | 1/1982 | Ono | 73/587 |
| 4,782,701 | 11/1988 | Proctor, Jr. | 73/587 |
| 5,029,474 | 7/1991 | Schulze | 73/587 |

FOREIGN PATENT DOCUMENTS

WO8905199 6/1989 WIPO.

*Primary Examiner*—J. Woodrow Eldred
*Attorney, Agent, or Firm*—Trexler, Bushnell, Giangiorgi & Blackstone, Ltd.

[57] ABSTRACT

An acoustic emission transducer consists of a resonant detection element (10) which is attached to the baseplate (16) by a small area in comparison to the overall surface area of the resonant detection element (10) where this area of attachment is positioned with respect to the wave motion during the resonance of the resonant detection element (10) so as not to have a significant effect on the resonant detection element (10) other than to physically couple the resonant detection element (10) to the baseplate (16) and introduce elastic waves from the baseplate (16) to the resonant detection element (10) at the desired frequency, while allowing damping materials (24) to be acoustically coupled to the larger part of the resonant detection element surface area to produce a resonant acoustic emission transducer having reproducible characteristics of resonant frequency and rate of damping.

9 Claims, 2 Drawing Sheets

RESONANT ACOUSTIC EMISSION TRANSDUCER

1 Field of the Invention

The present invention relates to Acoustic Emission (AE) transducers and more particularly to mechanically resonant AE transducers having controllable and reproducible resonant properties and characteristics.

Acoustic Emission or stress wave activity is structure borne elastic waves associated with either defect growth in materials in response to the stressing of material or machinery operation in which case they are produced by processes such as friction, impacts, turbulence, cavitation and material reduction which may be due to either mechanical degradation within the machine or the process which the machine is carrying out.

Resonant AE transducers are useful because of their high sensitivity to elastic waves at their resonant frequency and their inherent discrimination against elastic waves at other frequencies. In addition their simple response is easily measured and modelled enabling them to form the first stage in quantitative AE measurement and control systems.

2 Description of the Prior Art

In prior art methods of constructing AE transducers a piezo-ceramic element is used which produces an electrical charge on its electrodes in response to strain within the piezo-ceramic element. In resonant AE transducers the piezo-ceramic element is typically a cylinder, disc or cube and resonances within the piezo-ceramic element at specific frequencies lead to electrical signals being generated on the electrodes that are positioned on opposing faces of the piezo-ceramic element. The resonance of the transducer is controlled by the dimensions of the piezo-ceramic as well as its mechanical properties. To construct a transducer having a resonance at a particular frequency it is usual for at least one of the dimensions of the piezo-ceramic element to be chosen such that the desired detection frequency corresponds to a mechanical resonance of the piezo-ceramic element.

The construction of the AE transducer involves the bonding of the piezo-ceramic element to a base-plate, through which the elastic waves are transmitted from the surface of the component of interest to the piezo-ceramic element, and the attachment of signal leads to the electrode faces of the piezo-electric element. The bonding of the piezo-ceramic element to the baseplate can affect its mechanical resonance due to the damping effect of the adhesive this interface. In addition the presence of the baseplate, which may not have a perfect acoustic impedance match with the piezo-ceramic element, can diminish the strength of resonances at frequencies characteristic of the dimensions of the piezo-ceramic element and lead to additional resonances characteristic of the dimensions of the baseplate and piezo-ceramic element combined.

The main response characteristics of a resonant AE transducer are its peak sensitivity, its resonant frequency and its rate of damping. Peak sensitivity is determined by measuring the magnitude of the electrical signal from the transducer when excited at its resonant frequency by an elastic wave with a controlled wave amplitude at the resonant frequency. Transducers with high peak sensitivity produce larger electrical signals than those having a low peak sensitivity. The resonant frequency can be determined by scanning the resonant frequency of the exciting signal of controlled amplitude and measuring the frequency at which there is a maximum response. The rate of damping of a resonant transducer can be determined by observing the decay of the electrical signal from the transducer in response to an impulsive or transient excitation. Transducers with low decay rates ring for longer after such an excitation than those having high decay rates.

Another important consideration when it is intended to use the signal from a resonant AE transducer in a quantitative manner is the influence of attaching the AE transducer to a workpiece on the above resonant characteristics. The alteration of the transducer characteristics when a resonant AE transducer is coupled to a workpiece can be seen by comparing the transducer output signal in response to a controlled stimulus when the transducer is freestanding and coupled to a workpiece.

Each of the characteristics peak sensitivity, resonant frequency and rate of damping for a resonant AE transducer is strongly affected by the transducer design and method of construction. In addition a representative sample of AE transducers manufactured according to any one design and construction method will exhibit a random variation in the values of these characteristics between different transducers of the same type. A significant contribution to this random variation results from subtle differences occurring during the construction of the transducer such as the bonding of the crystal to the base-plate and the attachment of the signal leads to the electrodes of the piezo-ceramic element.

A first type of resonant AE transducer is constructed using a cylindrical element where the electrodes are formed on the two ends of the cylinder and one of the ends is bonded to the baseplate and the resonance condition corresponds to a thickness mode of the cylinder. A second type of resonant AE transducer is constructed using a cube shaped piezo-ceramic element where the electrodes are formed on two opposite faces of the cube and one of these faces is bonded to the baseplate and the resonance condition corresponds to a thickness mode of the cube. In both this first and second type of resonant AE transducer the resonance condition involves the propagation of an internally reflected wave so as to repeatedly meet the interface between the piezo-ceramic element and the baseplate at right angles. Hence the resonance condition is very dependent upon the absorption, transmission and reflection coefficients associated with this interface. In addition the transmitted wave at this interface will both reflect within the baseplate and leak out into the workpiece to which the transducer baseplate is attached. A second resonant condition will exist associated with a thickness mode over the combined length of the piezo-ceramic element and the baseplate thickness. As a result the relative strengths of these two resonances and their rates of damping for transducers according to this first and second type of construction will depend upon the adhesive layer between the piezo-ceramic element and the baseplate and the acoustic coupling of the baseplate to the workpiece.

A third type of resonant AE transducer is constructed using a cylindrical or disc shaped element where the electrodes are formed on the two ends of the cylinder and one of the ends is bonded to the baseplate and the resonance condition corresponds to a diametral mode of the cylinder. A fourth type of resonant AE transducer is constructed using a cube shaped piezo-ceramic element where the electrodes are formed on two opposite faces of the cube and one of the electrode faces is bonded to the baseplate and the resonance condition corresponds to a lateral mode of the cube. A fifth type of resonant AE transducer is constructed using a cube shaped piezo-ceramic element where the electrodes are formed on two opposite faces of the cube and one of the non-electrode faces is bonded to the baseplate and the resonance condition corresponds to a lateral mode of the cube. Transducers constructed according to this third, fourth and fifth type of construction have a resonance condition in which the internally reflected wave propagates at right angles to the interface between the piezo-ceramic element and the baseplate. In doing so a significant fraction of the surface distortions essential to the resonance of the crystal are being restrained by the adhesive layer leading to damping of the resonance and coupling of the wave back into the baseplate. In a thin disc almost 50% of the surface area of the piezo-ceramic normal to the propagation is restrained whereas in a cube 25% of the surface of the piezo-ceramic normal to the propagation is restrained. As a result the damping in AE transducers according to this third, fourth and fifth type of construction is very dependent upon the properties of the adhesive at the interface between the piezo-ceramic and the baseplate and the acoustic coupling between the baseplate and the workpiece.

Whilst variations in peak sensitivity from AE transducer to AE transducer can be readily corrected for by trimming the gain of the preamplifier which forms the first stage in the amplification of the electrical signal from the AE transducer the effects of variations in the resonant frequency and rate of damping cannot be simply corrected for in subsequent electronics. If the outputs of resonant AE transducers are to be used quantitatively and different AE transducers of the same type are to be used interchangeably it is essential that these AE transducers are manufactured in such a way that the resonant frequency and rate of damping are repeatable from transducer to transducer and that values of these parameters are not significantly altered by the attachment of the transducer to a workpiece.

SUMMARY OF THE INVENTION

Traditional methods of constructing resonant AE transducers do not enable resonant AE transducers to be manufactured with sufficient repeatability to allow them to be used interchangeably when their outputs are to be treated in a quantitative manner. It is therefore an object of this invention to provide an improved resonant AE transducer with a view to overcoming the deficiencies of the prior art.

Accordingly the present invention resides in a resonant AE transducer consisting of a resonant detection element which is attached to the base-plate by a small area in comparison to the overall surface area of the resonant detection element where this area of attachment is positioned with respect to the wave motion during the resonance of the resonant detection element so as not to have a significant effect on the resonant detection element other than to introduce elastic waves from the baseplate to the resonant detection element at the desired frequency and physically attach the resonant detection element to the baseplate, whilst allowing damping materials to be acoustically coupled to the larger part of the resonant detection element surface area to produce a resonant AE transducer having reproducible characteristics of resonant frequency and rate of damping.

The resonant detection element may be a piezo-ceramic cylinder having electrodes on its end faces and being attached to the baseplate by a line contact along its side.

The damping material applied to the exposed surfaces of the resonant detection element may be silicone rubber.

The baseplate may include electrically isolated terminals or pads via which electrical contact with the electrodes of the piezoelectric element may be made.

The baseplate may be of a multi-layer construction including an insulating layer onto which a printed circuit may be formed including conducting tracks leading to the electrodes of file piezoelectric element.

The baseplate may be of a multi-layer construction including an insulating layer onto which a printed circuit may be formed to enable additional electronic components to be fitted so as to amplify, condition, process and detect signals from the piezoelectric element.

BRIEF DESCRIPTION OF THE DRAWINGS

The present invention will be more fully explained by way of example with reference to the accompanying drawings in which.

DETAILED DESCRIPTION OF THE PREFERRED EMBODIMENT

Figure 1A:
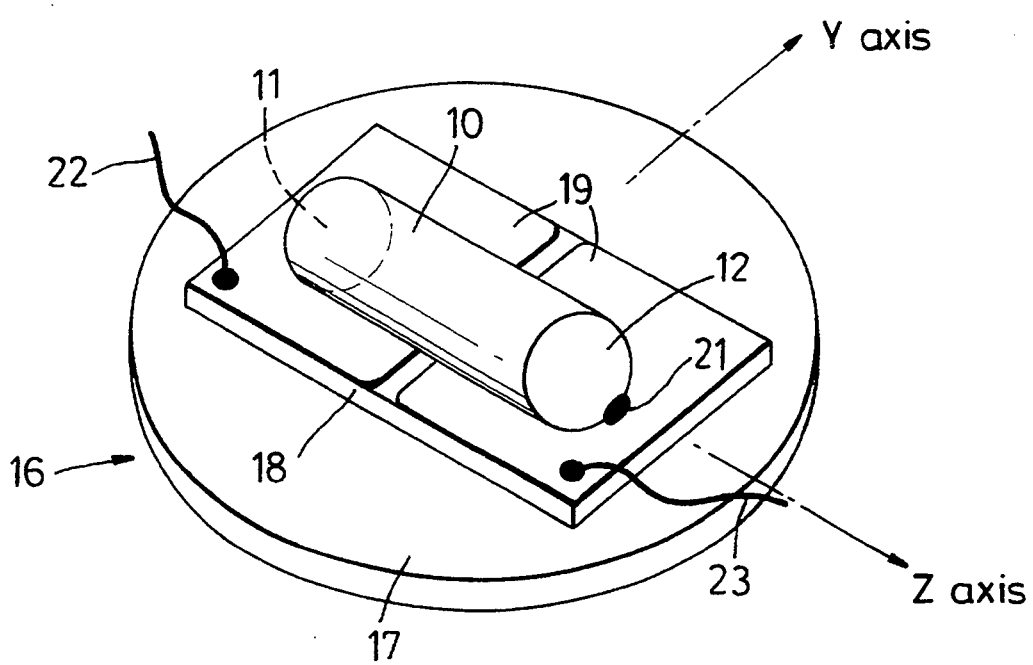
FIG. 1 (a) and 1 (b) show different aspects of a cylindrical piezo-electric element bonded to a baseplate according to the present invention.
Figure 1B:
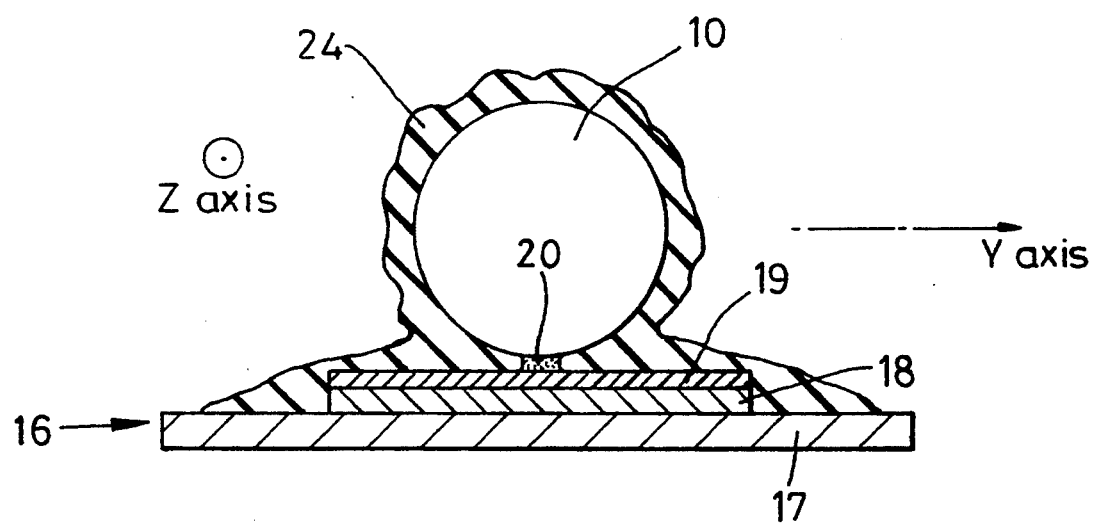

FIG. 1 illustrates a piezo-electric element 10 which is of a generally cylindrical shape. The piezo-electric element 10 has a longitudinal axis Z and may be a piezo-ceramic material such Lead Zirconate Titanate poled in the same direction as the Z axis. A pair of electrodes 11 and 12, which may consist of deposited layers of silver, are positioned on the two end faces of the piezo-electric element 10. The electrical signal developed across the electrodes 11 and 12 will be at a maximum for compressional waves in the direction of the Z axis.

A baseplate 16 consists of a stainless steel disc 17, although other electrically conducting materials can be used, onto which a printed circuit board 18 is adhesively bonded. The exposed copper face of the printed circuit board 19 is etched in order to separate it into two electrically isolated portions. The piezo-electric element 10 is oriented so that its convex surface lies along the surface of the printed circuit board so as to span the etched gap between the two electrically isolated portions of the copper face of the printed circuit board. A thin layer of adhesive 20 along the line contact between the convex surface of the piezo-electric element 10 and the etched surface of the copper face of the printed circuit board 19 physically secures the assembly and improves the transmission of elastic waves between the baseplate 16 and the piezo-electric element 10.

Electrical contact between electrodes 11 and 12 and their immediately adjacent electrically isolated portions of the copper face of the printed circuit board 19 is made using a small amount of silver loaded epoxy 21, although other electrically conducting adhesives or low temperature solder can be used. Electrical signal leads 22 and 23 are attached to each of the two electrically isolated portions of the copper face of the printed circuit board 19 using conducting adhesive although other means of attachment such as soldering can be used. The piezo-electric element 10 and the exposed surface of the printed circuit board 18 are coated with a damping material 24 which attenuates the amplitude of stress waves interacting with the surface to which it is adhered. The damping material 24 can be silicone rubber although other suitable materials can be used.

Figure 2:
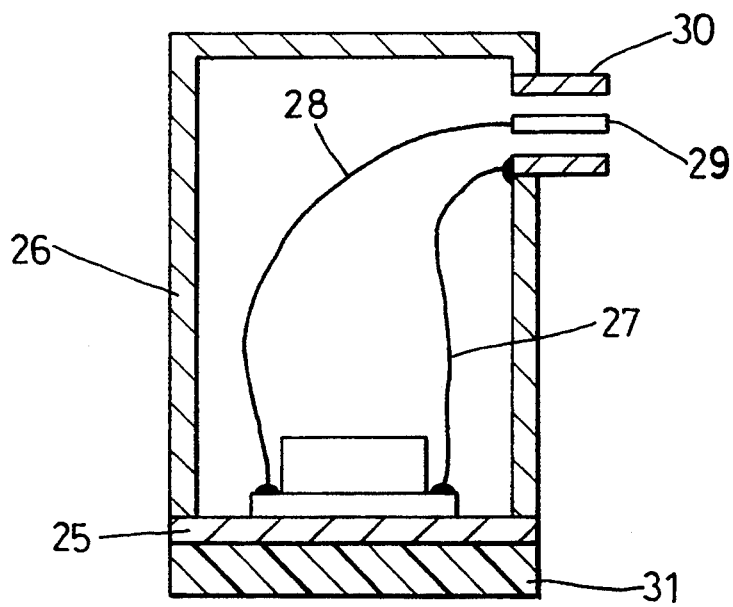
FIG. 2 shows the cross section of an AE transducer in which the cylindrical piezo-electric element and the baseplate shown in FIG. 1 is mounted to form a single-ended output transducer.

FIG. 2 shows the cross-section of a resonant Acoustic Emission transducer with a single ended signal output which incorporates the piezo-electric element and baseplate assembly shown in FIG. 1. The electrically conducting disc 25, which may be of stainless steel, forming the lower layer of the baseplate assembly shown in FIG. 1 is bonded to the stainless steel transducer housing 26 using a conducting adhesive such as silver loaded epoxy to form a complete electrical shield around the transducer. One of the electrical signal leads 27 is electrically connected to the transducer housing 26 and the other electrical signal lead 28 is electrically connected to the signal pin of the coaxial electrical connector 29. The outer screen of the coaxial connector 30 is electrically connected to the transducer housing 26. An electrical insulating layer 31 is bonded to the outer face of the electrically conducting disc 25 in order to prevent the transducer housing from earthing locally during use.

Figure 3:
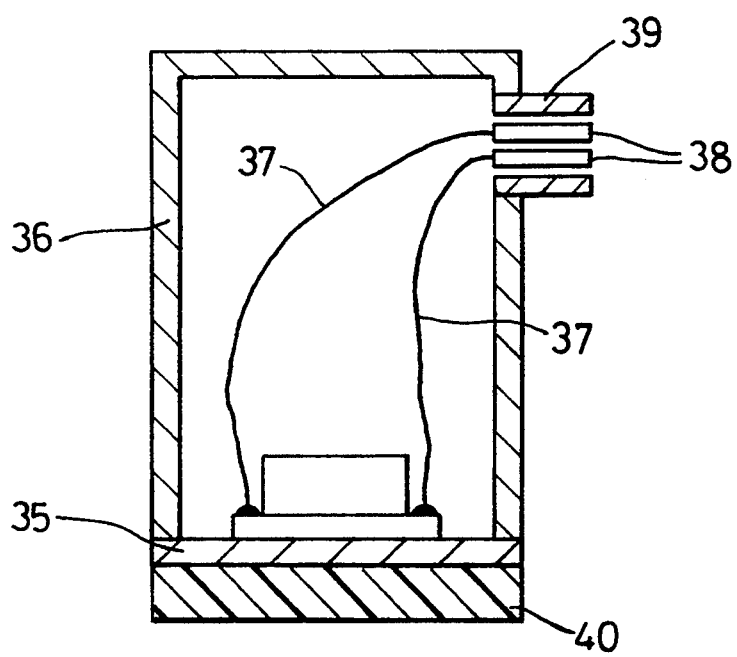
FIG. 3 shows the cross-section of an AE transducer in which the cylindrical piezo-electric element and the baseplate shown in FIG. 1 is mounted to form a differential output transducer.

FIG. 3 shows the cross-section of a resonant Acoustic Emission transducer with a differential signal output which incorporates the piezo-electric element and base-plate assembly shown in FIG. 1. The electrically conducting disc 35, which may be of stainless steel, forming the lower layer of the baseplate assembly shown in FIG. 1 is bonded to the stainless steel transducer housing 36 using a conducting adhesive such as silver loaded epoxy to form a complete electrical shield around the transducer. The electrical signal leads 37 are electrically connected to the two signal pins of the differential coaxial connector 38. The outer screen of the differential coaxial connector 39 is electrically connected to the transducer housing 36. An electrical insulating layer 40 is bonded to the outer face of the electrically conducting disc 35 in order to prevent the transducer housing from earthing locally during use.

In order to use the resulting AE transducer of the type shown in both FIG. 2 and FIG. 3 to detect stress waves within an object the exposed surface of the electrical insulating layer of the transducer is acoustically coupled to the surface of the object upon which Acoustic Emission measurements are to be made. Whilst a dry coupling can be used the acoustic coupling is usually improved by using a coupling agent to fill any small air gaps between the electrical insulating layer and the surface of the object. A fraction of the stress waves propagating underneath the transducer insulating layer will propagate through the insulating layer and the baseplate into the piezo-electric element where that part of the wave motion which has a frequency content corresponding to the resonant frequency of the piezo-electric element will excite it to resonate at a frequency characteristic of the length of the cylindrical element. This frequency is not significantly affected by the addition of the small amount of conducting adhesive or solder used to make electrical contact between the electrodes of the piezo-electric element and the electrically isolated areas of the printed circuit board. Since the damping material is chosen so as not to support the propagation of elastic waves at the frequencies of interest it does not significantly affect the resonant frequency of the piezo-electric element as a result of increasing characteristic dimension associated with the resonance. The damping of the resonance of the piezo-electric element is dominated by the damping caused by the layer of damping material applied to the piezo-electric element and the internal face of the baseplate. Consequently natural variations in the rate of damping of the finished AE transducer, as a result of inherent differences between piezo-electric elements and uncontrollable differences in the build of the Acoustic Emission transducer particularly with respect to the bonding of the transducer, bonding of different layers of the baseplate and means of electrical attachment to the piezo-electric element, will be minimised.

Typically the output from an AE transducer is amplified and filtered prior to being further processed. Some, or all of this electronics, can be incorporated within the housing either on a separate electronics board or on the same printed circuit board that the piezo-electric element is mounted.

I claim:

1. An Acoustic Emission transducer consisting of a resonant detection element which is attached to a baseplate where internally reflected waves giving rise to the resonance condition within the resonant detection element are not normally incident up on the mechanical interface between the resonant detection element and the base-plate where the area of attachment between the resonant detection element and the baseplate is small in comparison to the overall surface area of the resonant detection element being formed by one or more line contacts oriented to lie along the direction of wave motion so as not to have a significant effect on the resonant detection element other than to physically couple the resonant detection element to the baseplate and introduce elastic waves from the baseplate to the resonant detection element at the desired frequency where damping materials are acoustically coupled to the larger part of the resonant detection element surface area to produce a resonant Acoustic Emission transducer having reproducible characteristics of resonant frequency and rate of damping.

2. An Acoustic Emission transducer as claimed in claim 1 where the resonant detection element is a piezo-electric of generally cylindrical shape having electrodes on its end faces and being physically coupled to the baseplate by at least one line contact along its side.

3. An Acoustic Emission transducer as claimed in claim 1 where the resonant detection element is a piezo-ceramic of generally cylindrical shape having electrodes on its end faces and being physically coupled to the baseplate by at least one line contact along its side.

4. An Acoustic Emission transducer as claimed in claim 1 where the damping material applied to the exposed surfaces of the resonant detection element is silicone rubber.

5. An Acoustic Emission transducer as claimed in claim 1 where the baseplate includes electrically isolated areas of electrically conducting material via which electrical contact is made with electrodes of the resonant detection element.

6. An Acoustic Emission transducer as claimed in claim 1 where the baseplate is of a multi-layer construction including an insulating layer onto which an electrically conducting circuit is formed including conducting tracks leading to electrodes of the resonant detection element.

7. An Acoustic Emission transducer as claimed in claim 1 where the baseplate consists of metallic layer adhesively bonded to a printed circuit board onto which a printed circuit is formed including conducting tracks leading to electrodes on the surface of the resonant detection element.

8. An Acoustic Emission transducer as claimed in claim 1 where the baseplate is of a multi-layer construction including an insulating layer onto which an electrically conducting circuit is formed.

9. An Acoustic Emission transducer as claimed in claim 8 where other electronic components are fitted to the circuit to act upon electrical signals generated by the resonant detection element.

* * * * *